(12) United States Patent
Yermakov (10) Patent No.: US 10,530,669 B2
(45) Date of Patent: *Jan. 7, 2020

(54) NETWORK SERVICE AWARE ROUTERS, AND APPLICATIONS THEREOF

(71) Applicant: Level 3 Communications, LLC, Broomfield, CO (US)

(72) Inventor: Sergey Yermakov, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,881

(22) Filed: Dec. 21, 2018

(65) Prior Publication Data

US 2019/0123979 A1  Apr. 25, 2019

Related U.S. Application Data

(63) Continuation of application No. 15/948,717, filed on Apr. 9, 2018, now Pat. No. 10,164,845, which is a continuation of application No. 15/481,099, filed on Apr. 6, 2017, now Pat. No. 9,942,108, which is a continuation of application No. 14/599,207, filed on Jan. 16, 2015, now Pat. No. 9,634,894, which is a (Continued)

(51) Int. Cl.
| | |
|---|---|
| *H04L 12/28* | (2006.01) |
| *H04L 12/24* | (2006.01) |
| *H04L 12/771* | (2013.01) |
| *H04J 1/16* | (2006.01) |

(52) U.S. Cl.
CPC ...... *H04L 41/5054* (2013.01); *H04L 41/0813* (2013.01); *H04L 41/5003* (2013.01); *H04L 45/563* (2013.01)

(58) Field of Classification Search
CPC ............. H04L 41/0813; H04L 41/0886; H04L 41/5051; H04L 41/5054; H04L 45/563
USPC ......................................... 370/252, 389, 463
See application file for complete search history.

(56) References Cited

U.S. PATENT DOCUMENTS

| | | |
|---|---|---|
| 5,555,100 A | 9/1996 | Bloomfield |
| 5,915,008 A | 6/1999 | Dulman |

(Continued)

FOREIGN PATENT DOCUMENTS

WO    WO-2014052099    4/2014

OTHER PUBLICATIONS

Extended European Search Report, dated Jan. 22, 2018, Application No. 15835544.6, filed Aug. 28, 2015, 8 pgs.

(Continued)

*Primary Examiner* — John Pezzlo (57) ABSTRACT

In an embodiment, a computer-implemented method provides a service on a network. The method includes the following steps: (a) requesting, on a router, executable instructions from a remote server, the executable instructions specifying how the router is to operate to provide a service requested for a user of the network; (b) receiving the instructions; (c) initializing, on the router, a thread to execute the received instructions; (d) determining that a configuration of the router has changed; and (e) when the configuration of the router is determined to have changed, executing, on the initialized thread, the instructions to apply the service in accordance with the change in the router's configuration.

12 Claims, 4 Drawing Sheets

Related U.S. Application Data continuation of application No. 14/473,476, filed on Aug. 29, 2014, now Pat. No. 8,964,596.

(56) References Cited

U.S. PATENT DOCUMENTS

| | | |
|---|---|---|
| 6,493,341 B1 | 12/2002 | Datta et al. |
| 6,904,449 B1 | 6/2005 | Quinones |
| 7,613,126 B1 | 11/2009 | Natarajan et al. |
| 8,010,715 B2 | 8/2011 | Gale |
| 8,964,596 B1 | 2/2015 | Yermakov |
| 2004/0004967 A1 | 1/2004 | Nakatsugawa |
| 2004/0179524 A1 | 9/2004 | Sasagawa et al. |
| 2008/0095158 A1 | 4/2008 | Nakazawa |
| 2008/0219185 A1 | 9/2008 | Zou |
| 2009/0059937 A1* | 3/2009 | Kanada ............... H04L 41/5003 370/401 |
| 2009/0168664 A1 | 7/2009 | Washburn |
| 2010/0309907 A1 | 12/2010 | Prouix et al. |
| 2011/0292942 A1 | 12/2011 | Imai |
| 2012/0093508 A1 | 4/2012 | Baykal et al. |
| 2014/0040975 A1 | 2/2014 | Raleigh et al. |
| 2014/0052976 A1* | 2/2014 | Marino ................ G06F 21/56 713/2 |
| 2015/0230274 A1* | 8/2015 | Sharma ................ H04W 76/12 370/329 |
| 2015/0271022 A1 | 9/2015 | Seligson |
| 2015/0363603 A1* | 12/2015 | Hsu ....................... G06F 16/176 707/783 |
| 2016/0065408 A1 | 3/2016 | Yermakov |
| 2016/0234705 A1* | 8/2016 | Elliott .................. H04W 76/10 |
| 2017/0214586 A1 | 7/2017 | Yermakov |
| 2017/0295258 A1 | 10/2017 | Raleigh |
| 2018/0227196 A1 | 8/2018 | Yermakov |

OTHER PUBLICATIONS

International Preliminary Report on Patentability, dated Feb. 28, 2017, Int'l Appl. No. PCT/US15/047496, Int'l Filing Date Aug. 28, 2015, 7 pgs.

International Search Report dated Dec. 1, 2015, Int'l Appl. No. PCT/US15/047496, Int'l Filing Date Aug. 28, 2015, 3 pgs.

Written Opinion of the International Searching Authority dated Dec. 1, 2015, Int'l Appl. No. PCT/US15/047496, Int'l Filing Date Aug. 28, 2015, 5 pgs.

Japan Notice of Reasons for Rejection, dated Jun. 25, 2019, Application No. 2017-510661, filed Aug. 28, 2015, 9 pgs.

China First Office Action, dated Sep. 24, 2019, Application No. 201580046108.7, filed Aug. 28, 20215, 18 pgs.

\* cited by examiner

NETWORK SERVICE AWARE ROUTERS, AND APPLICATIONS THEREOF

BACKGROUND

Field

This field is generally related to network configuration.

Related Art

A communication network may, for example, provide a network connection that allows data to be transferred between two geographically remote locations. A network connection may span multiple links connecting communication devices such as routers. Networks may have different topologies depending on how the links are interconnected through the communication devices. Given a particular network topology, multiple routes may be available between a source and destination.

A service provider may configure a communication network to provide network services, such as a connectivity service. A service provider may maintain a connectivity service at a particular service level, such as a specific level of bandwidth, latency, or jitter. For example, a user may request an Ethernet connection between two of its locations with a bandwidth of 400 Mbit/second.

To configure a communication network to provide a network service, a provisioning server may send configuration messages to routing devices along the route of the network connection. The configuration messages may, for example, instruct the routing devices on how to route the data or of a service level to provide in transmitting from a particular user or through a service.

To add or make changes to a network service, a service provider network typically uses an inventory database. The inventory database tracks different users, their associated network services, and the routing devices used to provide the network services. When a new service is added to the inventory database, a provisioning server may push configuration messages to associated routing devices in the inventory database. When an existing service is modified, for example, to change a service level, the provisioning server may look to the inventory database to determine which routing devices to send messages to. In this way, a central provisioning server and inventory database typically determine which routing devices need to be configured.

While having a central provisioning server determine which routing devices to configure may have advantages, it can also create bottlenecks. It may cause delay in provisioning the service. Also, the routing devices may be heterogeneous and having the provisioning server configure a variety of different types of devices may lead to additional complexities.

BRIEF SUMMARY

In an embodiment, a computer-implemented method provides a service on a network. The method includes the following steps: (a) requesting, on a router, executable instructions from a remote server, the executable instructions specifying how the router is to operate to provide a service requested for a user of the network; (b) receiving the instructions; (c) initializing, on the router, a thread to execute the received instructions; (d) determining that a configuration of the router has changed; and (e) when the configuration of the router is determined to have changed, executing, on the initialized thread, instructions to apply the service in accordance with the change in the router's configuration.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As described above, having a central provisioning server and inventory database orchestrate network services can cause delay and complexity. To deal with this, embodiments here allow routing devices to learn of service changes dynamically without an orchestration process.

Figure 1:
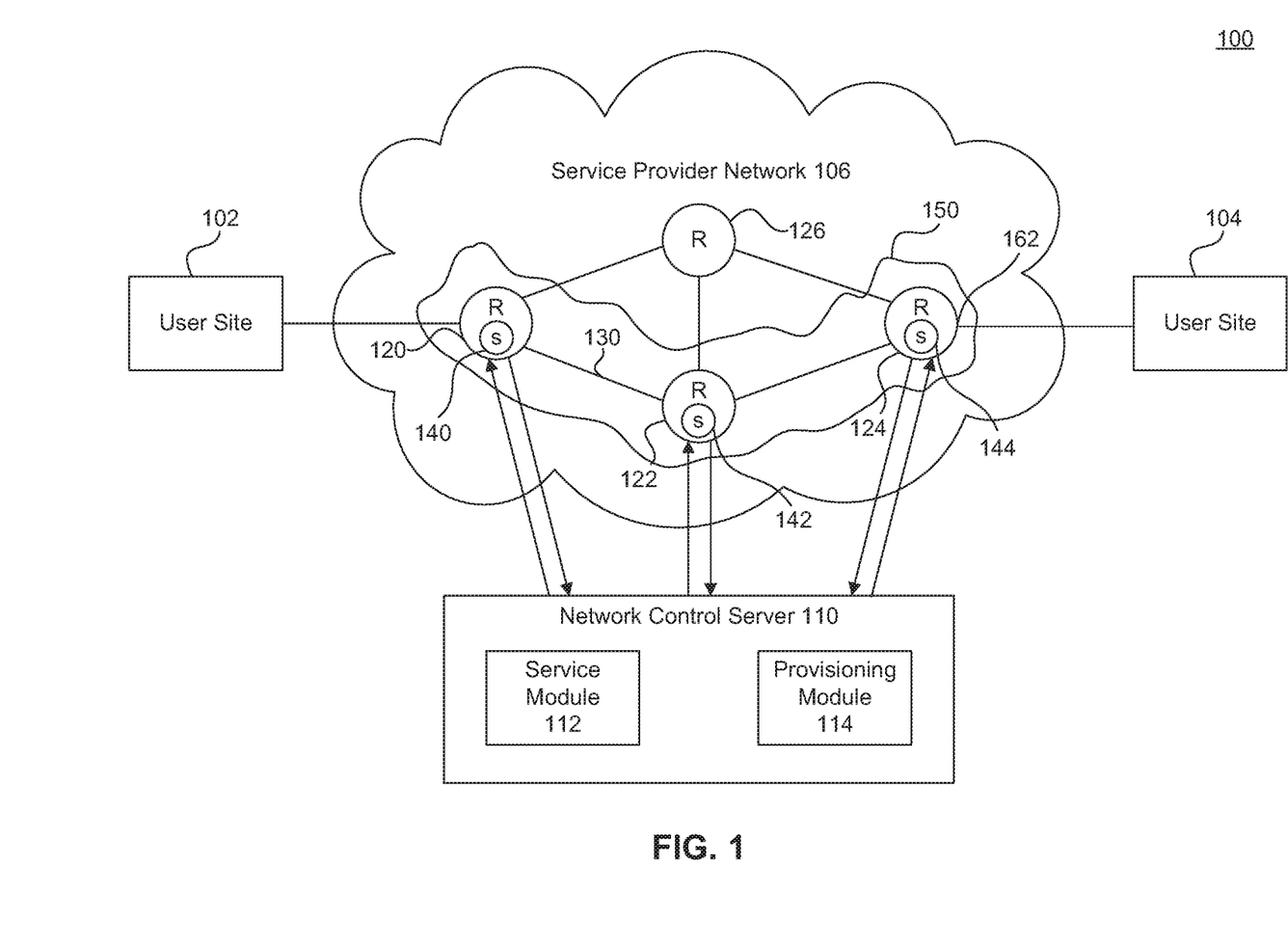
FIG. 1 is a diagram of a system for providing executable services to routing devices, according to an embodiment.

FIG. 1 is a diagram of a system 100 for providing executable services to routing devices, according to an embodiment. System 100 includes a service provider network 106 that connects two user sites: user site 102 and 104.

In one example, each user site 102 and 104 may be a customer's location and the customer may request that service provider network 106 provide connectivity between the two locations. Service provider network 106 may be a local area network (LAN), metropolitan area network (MAN), or wide area network (WAN). It may utilize any point-to-point or multipoint-to-multipoint networking protocols. The network access protocols used may include, for example, Multi-Protocol Label Switching (MPLS), Ethernet, Asynchronous Transfer Mode (ATM), High-Level Data Link Control (HDLC), or Packet Relay.

Service provider network 106 includes a plurality of routing devices, such as routing devices 120, 122, and 124. Routing devices 120, 122, and 124 are sometimes for convenience referred to here as routers. The routing devices, or routers, are interconnected by links. For example, routing devices 120 and 122 are connected by a link 130. The routing devices are devices that forward packets, including devices at the data link layer (Open Systems Interconnection layer 2) and the network layer (Open Systems Interconnection layer 3).

On receipt of a packet, a routing device may determine which link to forward on based on the router's own configuration, for example the router's routing table, and characteristics the packet, such as the packet's destination address. As described above, in typical systems, changes to this configuration are done through a central orchestration system. For example, a user may schedule a bandwidth increase for a time in the future. When the orchestration server determines that scheduled time occurs, the orchestration server would send instructions to the routing devices changing their configuration to allow for the bandwidth increase. In this way, the orchestration server would execute the functionality describing how to provide the network service change.

In embodiments disclosed here, this functionality of determining how to provide the network service would occur not on the orchestration server, but on the routing devices themselves. In particular, routing devices 120, 122, and 124 each have a process running that specifies how to implement the service: processes 140, 142, and 144 respectively. The process, or daemon, may run its own thread of execution within its routing device. It may execute certain functionality when new traffic is received belonging to a particular user or being assigned to the service. Further, it may execute certain functionality when a configuration change is on the server. Still further, it may execute certain functionality periodically, regardless of the traffic received. In this way, embodiments enable the routers themselves to implement network services.

But, having the routing devices execute the functionality to implement the network services still may not obviate the need for some external, remote server. In particular, system 100 includes a network control server 110 that the routing devices 120, 122, and 124 communicate with to load their respective service processes 140, 142, and 144. To communicate with routing devices 120, 122, and 124, network control server 110 may be included in or coupled with service provider network 106.

Network control server 110 includes a provisioning module 114 and a service module 112. Provisioning module 114 maintains a list of service provider network 106's subscribed users and associated services. When a routing device detects traffic belonging to a new user, the routing device may send a message to network control server 110, which in turn forwards it to provisioning module 114. In response the message, provisioning module 114 may query a memory, such as a database (not shown), that maps data identifying a particular user (such as a source address or subnet) to associated services. Then, provisioning module 114 may send the results of the query back to the routing device that made the request. The response may identify each of the services that the user is subscribed to.

When the routing device receives the list of services, it may send another message to network control server 110, which this time forwards the request to service module 112. Service module 112 may include a repository listing all the services provided by service provider network 106. For each service, the repository may include an executable file including instructions on how the routing device is to operate to provide the service. The executable file may be, for example, a compiled, binary executable file or an un-compiled script. In response to the request, service module 112 may retrieve executable files for requested services and return them to the routing device. While service module 112 and provisioning module 114 are shown here on a single server for clarity, they may also be implemented on separate servers.

On receipt of the executable files, the routing device may initialize a thread for each service. The thread provides the functionality of the requested service.

FIG. 1 identifies the processes 140, 142, and 144 with different reference numbers because they are running on different routing devices. But, each of the processes 140, 142, and 144 may be an instantiation of the same executable file retrieved from service module 112. That executable file may specify functionality for the entire service and each of routing devices 120, 122, and 124 that participate in providing that service. But, even though processes 140, 142, and 144 may be executing the same service executable file, they may have different functionality. In particular, the service executable file may specify different functionality for different routing devices. On startup, a process may check the routing device's configuration to identify the device and execute functionality that the executable file specified for that particular device.

In one example, the user may subscribe to a service that collects metrics regarding the user's network traffic. Conventionally, to implement the service, an orchestration server would, using its knowledge of the routing devices involved in the user's traffic, periodically send requests to the routing devices querying them for metrics. However, in an embodiment disclosed here, processes 140, 142, and 144 may collect data and provide it as specified by the subscribed service.

In another example, the user may subscribe to a dynamic capacity service that changes a particular service level over time. The change may be at a scheduled time or the change may be in response to network conditions. For example, if a particular usage metric (such as bandwidth utilization) exceeds a threshold, the service may change a policer on the router to allow more bandwidth for the connection. Conventionally, orchestration server would monitor the time or network conditions and send instructions to the routing devices when the scheduled time or network connections are met. However, in an embodiment disclosed here, processes 140, 142, and 144 running on the routing devices themselves may determine when the appropriate time occurs or when the condition triggers using the router's configuration information (such as its configured time or utilization information). When the process determines that the appropriate time occurs or condition triggers, the process changes the routing device configuration to provide a new service level in accordance with the subscribed dynamic capacity service.

In some embodiments, multiple processes 140, 142, and 144 may communicate with each other to form their own service network 150, which is a group of routers that work in concert to provide the service. To establish service network 150, at least one of the processes 140, 142, and 144 may discover which other routers participate in providing the service. One of the processes may take a leading role and broadcast discovery messages to identify which others are participating in the service. Or, the processes may treat each other as peers and exchange packets identifying neighboring routing devices that are involved in providing the service.

For example, processes 140, 142, and 144 may communicate with each other to discover how to forward data through service network 150. Each process may learn the routing devices' neighbors and communicate that information to other routers in service network 150. For example, process 144 may learn router 124's neighbors by looking at its configuration information. From the configuration information, process 144 may learn that router 144 is connected to user site 104 through a port 162. Then, process 144 may communicate that information to router 122 and its service process 142. In turn, service process 142 may send a message to router 122 and service process 140 indicating that it can reach user site 104 through router 144. Using that reachability information, the routers can forward data through the service network. For example, when service process 140 receives traffic from user site 102 destined for user site 104, service process 140 can route the traffic to routing device 122, which in turn can route the traffic through routing device 124 to user site 104. By discovering a service network in this way, processes 140, 142, and 144 can cooperate to route traffic in accordance with a subscribed service without the need for an orchestration server to send routing instructions to each routing device.

In addition to using the service network to route traffic from a source to a destination, the service network can also load balance between different routes from the source to the destination. For example, suppose routing device 126 in FIG. 1 was part of the service network 150. For example, process 140 may discover the service network topology (e.g., by broadcasting discovery packets as above). From that topology, process 140 may determine that multiple paths connect user site 102 and user site 104. In particular, when router 120 receives data from user site 102 destined for user site 104, process 140 can determine whether to route data to router 122 or 126, both of which lead to user site 104 through router 124. To balance traffic across the network, process 140 can make that determination based on utilization information from routers on the respective paths, perhaps collected and transmitted to process 140 by the other service processes themselves. Alternatively, process 140 can balance traffic between the paths using round-robin or other ways as a skilled artisan would recognize.

In this way, embodiments move the functionality of providing a service from an orchestration server to a routing device. An example routing device is illustrated in FIG. 2 in greater detail.

Figure 2:
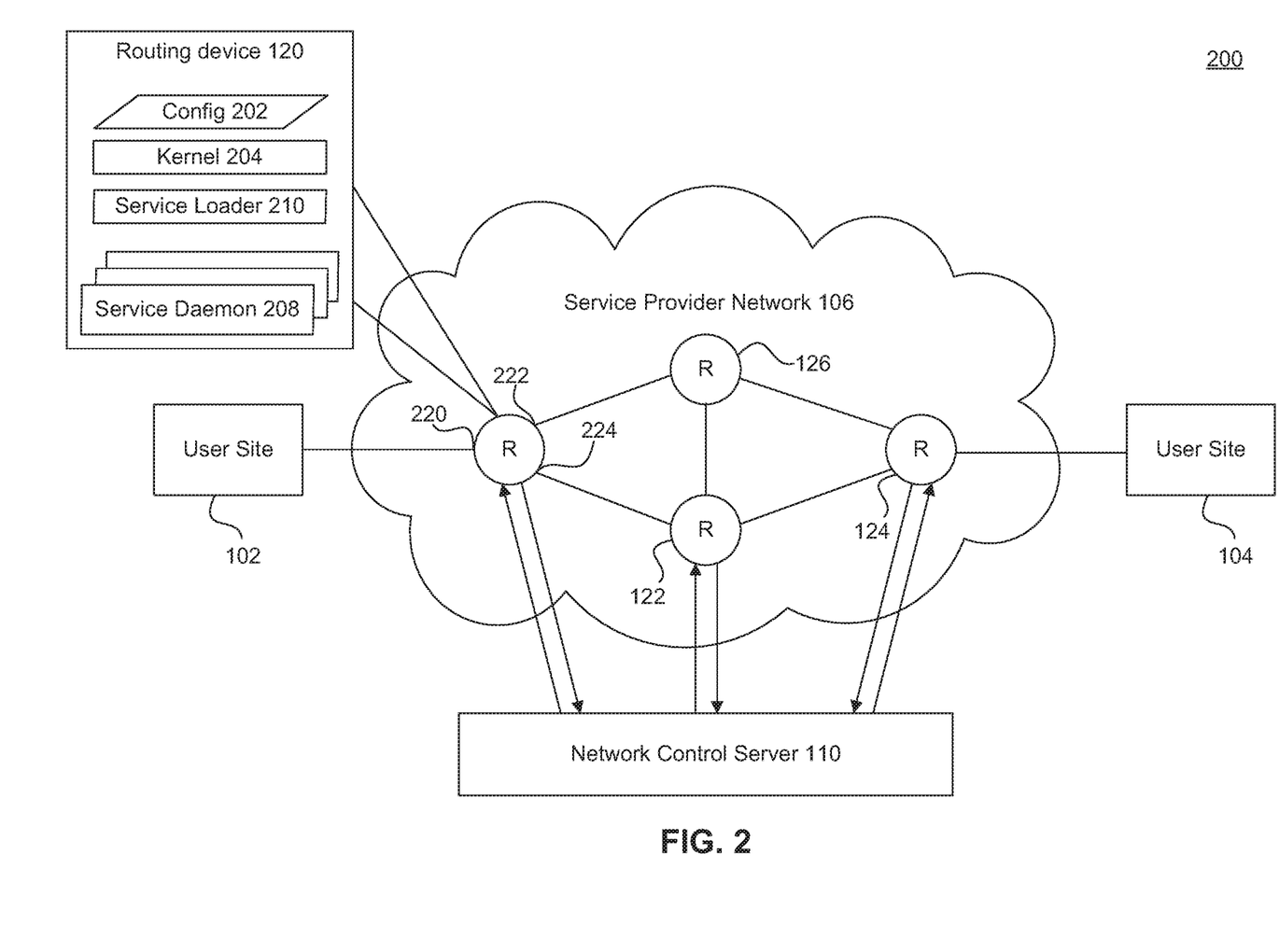
FIG. 2 is a diagram showing a routing device of the system in FIG. 1 in greater detail, according to an embodiment.

FIG. 2 is a diagram 200 showing routing device 120 in greater detail. Routing device 120 includes a kernel 204.

Kernel 204, as known in the computing arts, is the routing device 120's operating system. It is a computer program that manages input and output requests from software, and translates them into data processing instructions for the central processing unit and other electronic components of the routing device. It also manages the various concurrent threads of execution on routing device 120.

Stored on routing device 120 is a configuration file 202. Configuration file 202 may have knowledge of all the different users that subscribe to service provider network 106, or at least all the different users that subscribe to services that utilize router 120. For example, configuration file 202 may indicate that a particular port of router 120 belongs to a particular user. In diagram 200, router 120 for example has ports 220, 222, and 224. Port 220 is connected to a network at user site 102. And configuration file 202 may associate port 220 with a user having the network at user site 102. In other examples, routing device 120 may recognize that data belongs to a particular user by examining its source address. In that example, configuration file 202 may have a source address or range of source addresses (such as an Internet Protocol subnet) that is associated with each user.

In one embodiment, an administrator may define aspects of configuration file 202. In other examples, configuration file 202, or portions thereof, may be loaded from network control server 110 by, for example, a service loader process 210 on router 120. Router 120 or kernel 204 may be configured to initiate service loader 210 on startup. Once initiated, service loader 210 queries network control server 110 for the list of current users. Service loader 210 may also query network control server 110 periodically to check for updates in the list of current users. As described above with respect FIG. 1, when service loader 210 detects a new user, it may first query network control server 110 for a list of services that the user subscribes to and then again query network control server 110 for executable files corresponding to the services.

Once the executable files are received at router 120, kernel 204 or service loader 210 may initiate them as service daemons 208. Each of service daemons 208 is a process as described with respect to FIG. 1 that implements functionality to execute a service. To execute the service, service daemons 208 may, for example, listen for changes to configuration file 202. In response to changes, service daemons 208 may write additional changes to configuration file 202, for example to update the router's routing table, or other configuration information, to implement the service. In some embodiments, service daemons 208 may also listen for incoming traffic and be notified when traffic meeting certain conditions, such as originating from a certain address, is received.

This architecture is flexible in that services may be updated automatically. Service daemons 208 may detect when changes are needed and report to network control server 110 to access updates. For example, service daemons 208 may detect if its router 120 is no longer connected to other routers in a service network and report to network control server 110 to update the installed services as needed.

In addition, because the service functionality is decentralized, it is more resilient. For example, in conventional systems, a single provisioning server may be responsible for the orchestrating services across the network. Should that provisioning server go down, much of the services on the service provider network may be inoperable until a backup is in place. Effectively, a single provisioning server creates a single point of failure. But, when the routers implement the services themselves and a router goes down, only the services provided by the failed router may be affected. In this way, the routers are made more autonomous, and the network is made more resilient.

Figure 3:
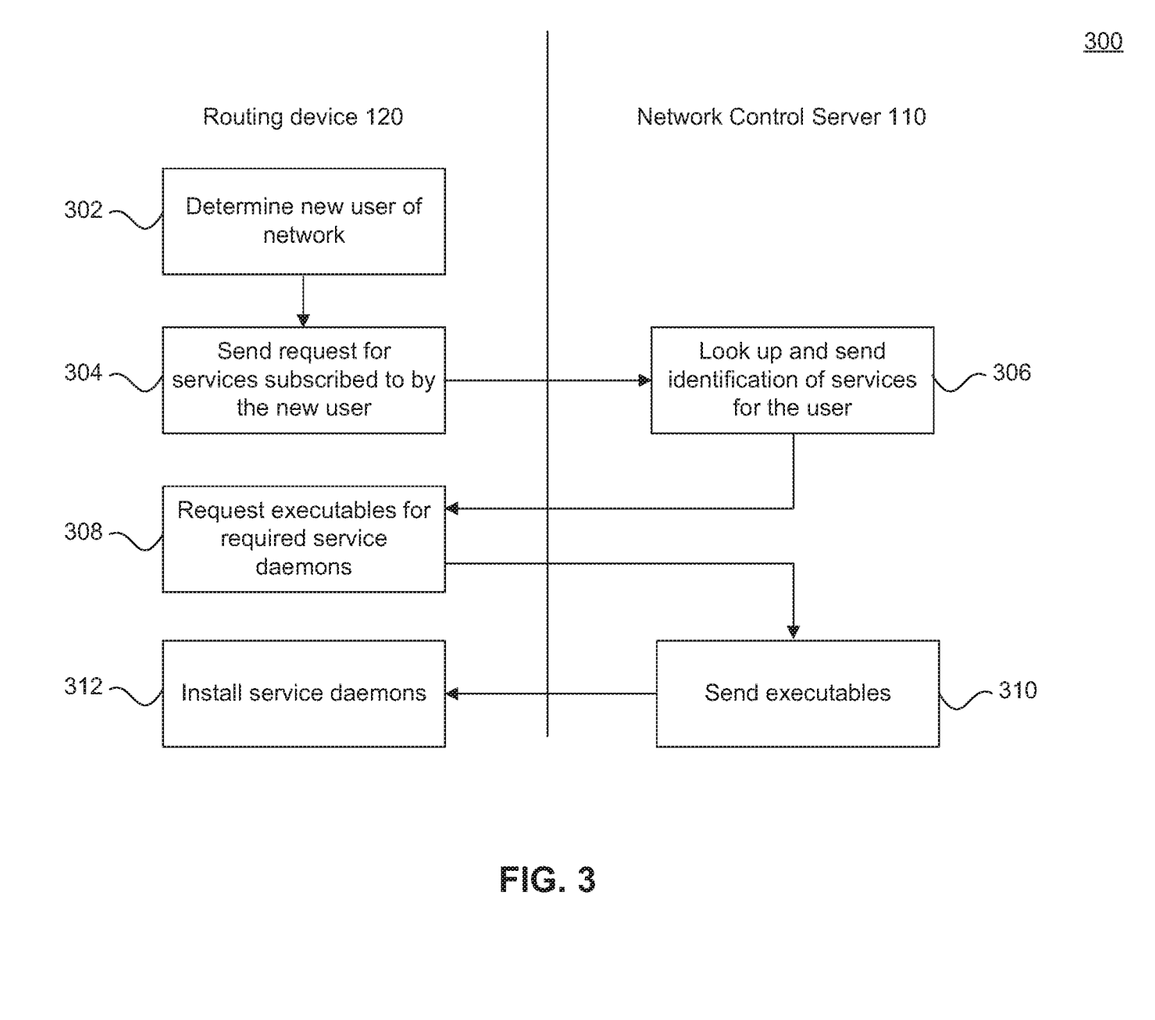
FIG. 3 is a flowchart of a method for provisioning a new service to a switch, according to an embodiment.

FIG. 3 is a flowchart of a method 300 for provisioning a new service to a switch, an according to an embodiment.

Method 300 begins at step 302 when router 120 determines that the user is newly connected to the network. This step may occur, for example, when router 120's configuration file is updated to reflect that a new user has subscribed to the service provider network. The configuration file may be updated by an operator or by, for example, a provisioning system acting in response to an order from the user.

At step 304, router 120 sends a request querying a remote server, in particular network control server 110, for a list of services that the user subscribed to. In response to the query, network control server 110 looks up the services and sends information identifying the services that the user subscribed to back to router 120 at step 306.

On receipt of information identifying which services the user subscribed to, router 120 determines which service executable files it needs. For some of the services, router 120 may already have a copy of the executable file and may even already have the a service daemon running. For those that it does not, router 120 sends another request to network control server 110 at step 308. This request identifies the services. Network control server 110 may determine that to provide this service to this user, this router does not need to run any executable file. But if it does determine that the router needs to run an executable, network control server 110 returns an executable file for each of the requested services.

On receipt of the executable files, routing device 120 initializes a process for each of the received executable files. With the processes running, they can participate in providing network services. To provide the network service, the processes may listen for changes in the router's configuration, as illustrated in FIG. 4.

Figure 4:
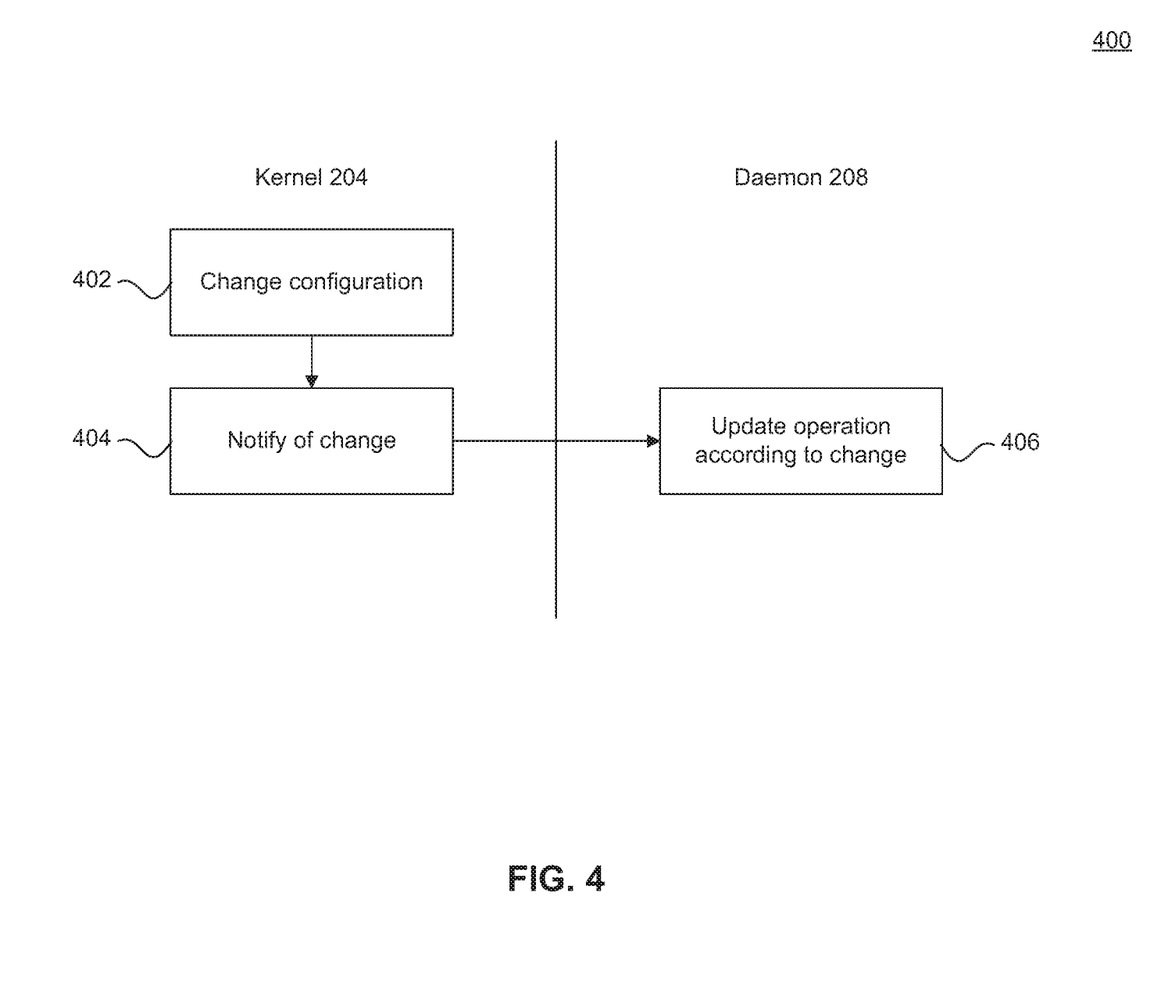
FIG. 4 is a flowchart of a method for changing a switch's configuration, according to an embodiment.

FIG. 4 is a flowchart of a method 400 for changing a switch's configuration, according to an embodiment.

Method 400 begins at step 402 when kernel 204 detects a change in the router configuration. When kernel 204 detects a change in the router configuration, it notifies any daemons listening for the change at step 404, in this case daemon 208. The notification may, for example, occur asynchronously through a callback function that kernel 204 calls when a particular change occurs. In another example, daemon 208 may periodically check the router configuration for changes.

On receiving the notification, daemon 208 executes the functionality specified in the executable file to provide the service. For example, in a dynamic capacity example, the router configuration would include data on the user's bandwidth utilization and daemon 208 would be notified of a change in that utilization level at step 404. At step 406, daemon 208 would check to see if the utilization level meets a condition, such as a threshold, and, if it does, it would alter the router configuration to change a bandwidth limit associated with the user.

As mentioned above, daemon 208 can provide in a wide variety of services. In examples above, daemon 208 could provide a network connection (such as an Ethernet e-line), collect network metrics, provide dynamic capacity, and provide route determination and load balancing. Other services could also be provided by daemon 208. For example, daemon 208 could provide an artificial neural network, compression, firewall, intrusion detection, or wide area network (WAN) acceleration.

As mentioned above, various service processes running on different processes may communicate with each other to form a group of routers that together participate in providing a service. In examples above, the group of routers can work together to provide route determination and load balancing. Other services that the group could provide may be traffic switching, re-routing (for example, in response to congestion or a failed component), and collection of aggregated metrics reflecting utilization of the entire router group.

Each of the devices and modules in FIGS. 1 and 2 may be implemented in hardware, software, firmware, or any combination thereof.

Each of the devices and modules in FIGS. 1 and 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing a service on a network, comprising:
   (a) requesting, on a router, executable instructions from a remote server, the executable instructions specifying how the router is to operate to provide a service requested for a user of the network;
   (b) receiving the executable instructions;
   (c) initializing, on the router, a thread to execute the received executable instructions;
   (d) determining that a router condition related to the router has changed; and
   (e) when the router condition related to the router is determined to have changed, executing, on the initialized thread, the executable instructions to apply the service in accordance with the change in the router condition related to the router,
   wherein the determining (d) comprises:
   (i) determining that a scheduled time has occurred, and
   wherein the executing (e) comprises:
   (ii) updating the configuration of the router to change a service level associated with the user based on the scheduled time.

2. The method as recited in claim 1, further comprising:
   (f) determining, on the router, that the user is newly connected to the network; and
   (g) when the router determines that the user is newly connected, querying the remote server for a service the user subscribed to.

3. The method as recited in claim 1, further comprising:
   (f) before the requesting (a), determining, on the router, that the user is newly connected to the network;
   (g) when the router determines that the user is newly connected, querying the remote server for a service the user subscribed to; and
   (h) receiving, from the remote server, information identifying the service the user subscribed to, wherein the requesting (a) comprises:

(i) requesting the executable instructions from the remote server, the executable instructions specifying how the router is to operate to provide the identified service.

4. The method as recited in claim 1, further comprising: evaluating network traffic at the router to determine whether the network traffic is associated with the user of the network; and when the router determines that the network traffic is associated with the user of the network, notifying the thread to apply the service on the network traffic.

5. A non-transitory program storage device tangibly embodying a program of instructions executable by at least one machine to perform a method for providing a service on a network, said method comprising:
 (a) requesting, on a router, executable instructions from a remote server, the executable instructions specifying how the router is to operate to provide a service requested for a user of the network;
 (b) receiving the executable instructions;
 (c) initializing, on the router, a thread to execute the received executable instructions;
 (d) determining that a router condition related to the router has changed; and
 (e) when the router condition related to the router is determined to have changed, executing, on the initialized thread, the executable instructions to apply the service in accordance with the change in the router condition related to the router,
 wherein the determining (d) comprises:
 (i) determining that a scheduled time has occurred, and
 wherein the executing (e) comprises:
 (ii) updating the configuration of the router to change a service level associated with the user based on the scheduled time.

6. The program storage device as recited in claim 5, further comprising:
 (f) determining, on the router, that the user is newly connected to the network; and
 (g) when the router determines that the user is newly connected, querying the remote server for a service the user subscribed to.

7. The program storage device as recited in claim 5, further comprising:
 (f) before the requesting (a), determining, on the router, that the user is newly connected to the network;
 (g) when the router determines that the user is newly connected, querying the remote server for a service the user subscribed to; and
 (h) receiving, from the remote server, information identifying the service the user subscribed to, wherein the requesting (a) comprises:
 (i) requesting the executable instructions from the remote server, the executable instructions specifying how the router is to operate to provide the identified service.

8. The program storage device as recited in claim 5, further comprising:
 evaluating network traffic at the router to determine whether the network traffic is associated with the user of the network; and
 when the router determines that the network traffic is associated with the user of the network, notifying the thread to apply the service on the network traffic.

9. A system for providing a service on a network, the system comprising:
 a memory that stores computer-executable instructions; and
 a processor configured to access the memory and execute the computer-executable instructions to:
 (a) request, on a router, executable instructions from a remote server, the executable instructions specifying how the router is to operate to provide a service requested for a user of the network;
 (b) receive the executable instructions;
 (c) initialize, on the router, a thread to execute the received executable instructions;
 (d) determine that a router condition related to the router has changed; and
 (e) when the router condition related to the router is determined to have changed, executing, on the initialized thread, the executable instructions to apply the service in accordance with the change in the router condition related to the router,
 wherein the determining (d) comprises the computer-executable instructions to:
 (i) determine that a scheduled time has occurred, and
 wherein the executing (e) comprises the computer-executable instructions to:
 (ii) update the configuration of the router to change a service level associated with the user based on the scheduled time.

10. The system as recited in claim 9, further comprising the computer-executable instructions to:
 (f) determine, on the router, that the user is newly connected to the network; and
 (g) when the router determines that the user is newly connected, query the remote server for a service the user subscribed to.

11. The system as recited in claim 9, further comprising the computer-executable instructions to:
 (f) before the requesting (a), determine, on the router, that the user is newly connected to the network;
 (g) when the router determines that the user is newly connected, query the remote server for a service the user subscribed to; and
 (h) receive, from the remote server, information identifying the service the user subscribed to, wherein the computer-executable instructions to request (a) comprises the computer-executable instructions to:
 (i) request the executable instructions from the remote server, the executable instructions specifying how the router is to operate to provide the identified service.

12. The system as recited in claim 9, further comprising the computer-executable instructions to:
 evaluate network traffic at the router to determine whether the network traffic is associated with the user of the network; and
 when the router determines that the network traffic is associated with the user of the network, notify the thread to apply the service on the network traffic.

* * * * *